United States Patent [19]

Kaneda et al.

[11] Patent Number: 5,453,895
[45] Date of Patent: Sep. 26, 1995

[54] MAGNETIC TAPE CASSETTE WITH GUIDE RIB BLADES EXTENDING INTO A FIXED HOLLOW TAPE GUIDE MEMBER

[75] Inventors: Hiroshi Kaneda; Matatoshi Okamura, both of Saku, Japan

[73] Assignee: TDK Corporation, Tokyo, Japan

[21] Appl. No.: 219,000

[22] Filed: Mar. 29, 1994

Related U.S. Application Data

[63] Continuation of Ser. No. 881,537, May 12, 1992, abandoned.

[30] Foreign Application Priority Data

May 13, 1991 [JP] Japan .................................. 3-042309

[51] Int. Cl.[6] ................................................. G11B 15/60
[52] U.S. Cl. ............................ 360/130.21; 242/346
[58] Field of Search ................................ 242/197, 199, 242/346; 226/196; 360/132, 130.21; 411/452, 500, 356

[56] References Cited

U.S. PATENT DOCUMENTS

| | | | |
|---|---|---|---|
| 4,371,131 | 2/1983 | Okamura et al. ................... | 242/199 |
| 4,706,148 | 11/1987 | Komiyama et al. ................. | 360/132 |
| 4,734,808 | 3/1988 | Kori et al. ........................... | 226/196 |
| 4,919,356 | 4/1990 | Nakagawa .......................... | 242/199 |
| 5,034,839 | 7/1991 | Okamura et al. ................... | 360/132 |
| 5,172,288 | 12/1992 | Shiba et al. ......................... | 360/132 |

FOREIGN PATENT DOCUMENTS

| | | | |
|---|---|---|---|
| 134778 | 5/1989 | Japan ............................. | 360/130.21 |
| 198276 | 8/1991 | Japan ............................. | 360/130.21 |
| 7315124 | 5/1975 | Netherlands ....................... | 411/452 |
| 2067514 | 7/1981 | United Kingdom . | |

Primary Examiner—Robert S. Tupper
Assistant Examiner—George J. Letscher
Attorney, Agent, or Firm—Price, Gess & Ubell

[57] ABSTRACT

A magnetic tape cassette capable of ensuring positive and stable mounting of a tape guide by a pressed fitting operation, to thereby prevent any displacement and backlash of a magnetic tape and ensure safe traveling of the tape. A fitted-on recess in which a hollow cylindrical tape guide is pressedly fixedly fitted at a lower end thereof is polygonally formed on an inner surface of a casing so as to inward project therefrom and a guide rib which is formed into a size smaller than an inner diameter of the tape guide is positively securely fitted at a lower end thereof in the fitted-on recess while being smoothly guided along the guide rib.

20 Claims, 3 Drawing Sheets

15,453,895

MAGNETIC TAPE CASSETTE WITH GUIDE RIB BLADES EXTENDING INTO A FIXED HOLLOW TAPE GUIDE MEMBER

This is a continuation of U.S. application Ser. No. 07/881,537, filed on May 12, 1992, now abandoned.

BACKGROUND OF THE INVENTION

1. Field of the Invention

This invention relates to a magnetic tape cassette, and more particularly to a magnetic tape cassette such as a video tape cassette, an 8 mm-tape cassette or the like.

2. Description of Related Art

In general, a video tape cassette which has been conventionally known in the art is so constructed that a tape guide which is supported on a guide pole is arranged on a tape travel path defined between a pair of reels rotatably arranged in a casing of the cassette, to thereby smoothly run a magnetic tape for winding or rewinding it on the reels while guiding it along the tape travel path.

Mounting of the tape guide on the guide pole is generally carried out by pressedly fitting the tape guide in a fitted-on hole or recess formed on an inner surface of the casing. In order to prevent backlash of the tape guide, the fitted-on hole is formed into substantially the same diameter as an outer diameter of the guide pole.

Thus, in the conventional magnetic tape cassette, it is required to apply a lubricant such as grease or the like to one end of the guide pole in order to facilitate pressed fitting of the guide pole in the fitted-on hole.

Unfortunately, pressed fitting of the cylindrical tape guide in the circular fitted-on hole causes any relief to be lost from the fitted-on hole or recess due to tight fitting between the tape guide and the hole, resulting in the tape guide being one-sided when it is fitted in the hole without using a central rib for positioning. This causes any displacement of the magnetic tape such as rising of the tape or the like, to possibly damage of the tape. Also, this imposes a restriction on assembling of the magnetic tape cassette, so that an increase in productivity is limited.

SUMMARY OF THE INVENTION

The present invention has been made in view of the foregoing disadvantage of the prior art.

Accordingly, it is an object of the present invention to provide a magnetic tape cassette which is capable of ensuring positive and stable mounting of a tape guide by pressed fitting.

It is another object of the present invention to provide a magnetic tape cassette which is capable of permitting a tape guide to be safely and effectively mounted to a degree sufficient to prevent any displacement of a magnetic tape.

It is a further object of the present invention to provide a magnetic tape cassette which is capable of permitting a magnetic tape to travel with safe and high reliability.

It is still another object of the present invention to provide a magnetic tape cassette which is capable of being readily assembled.

In accordance with the present invention, a magnetic tape cassette is provided. The magnetic tape cassette includes a casing including an upper casing member and a lower casing member jointed together so as to define a space therein, and a pair of reels which are rotatably arranged in the casing and on which a magnetic tape is wound so as to extend therebetween. The magnetic tape is arranged so as to travel along a tape travel path defined between the reels. The magnetic tape cassette also includes a fixed tape guide of a hollow cylindrical shape mounted on the casing so as to be arranged on the tape travel path, a recess provided on an inner surface of the casing through a polygonal fitted-on hole so as to permit the tape guide to be pressedly fitted therein, and a guide rib formed into a size smaller than an inner diameter of the fixed tape guide and arranged on a central portion of the recess so as to inward extend therefrom.

In a preferred embodiment of the present invention, the recess has a slant surface by beveling an upper end of the polygonal fit-on hole.

In a preferred embodiment of the present invention, the guide rib comprises a star-like impeller member having blades radially arranged.

In a preferred embodiment of the present invention, the recess is provided on the lower casing member and the fixed tape guide is fitted at a lower end thereof in the recess.

In a preferred embodiment of the present invention, a projection is provided on an inner surface of the upper casing member and formed into a diameter sufficient to permit it to be fittedly inserted in an upper end of the fixed tape guide

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENT

Now, a magnetic tape cassette according to the present invention will be described hereinafter with reference to the accompanying drawings.

Figure 1:
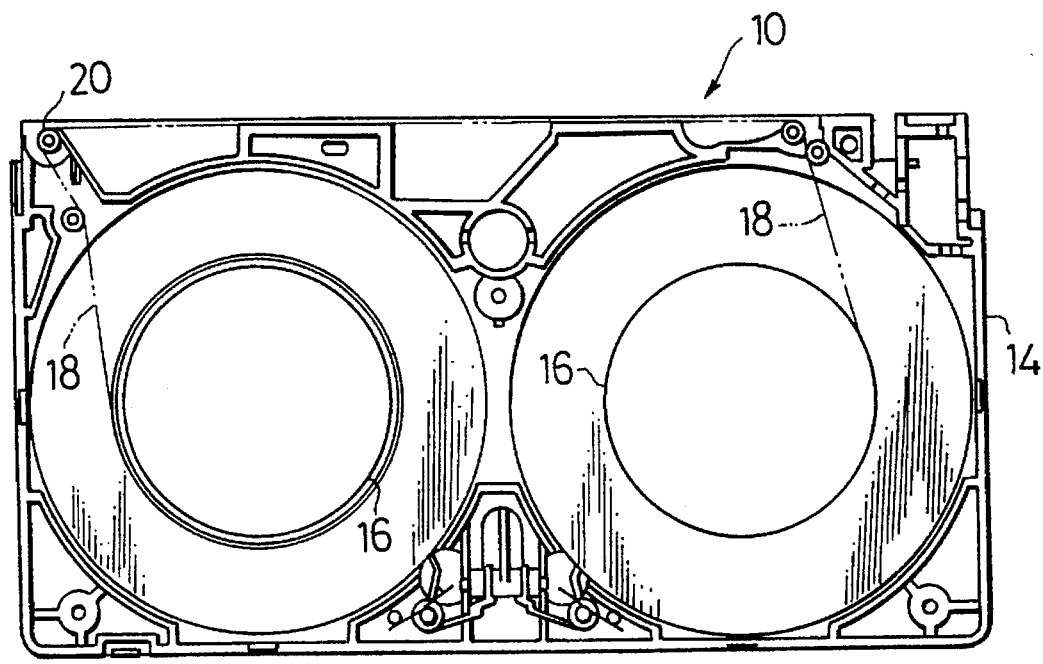
FIG. 1 is a plan view showing an embodiment of a magnetic tape cassette according to the present invention, wherein an upper casing member is removed for the sake of clarity.
Figure 2:
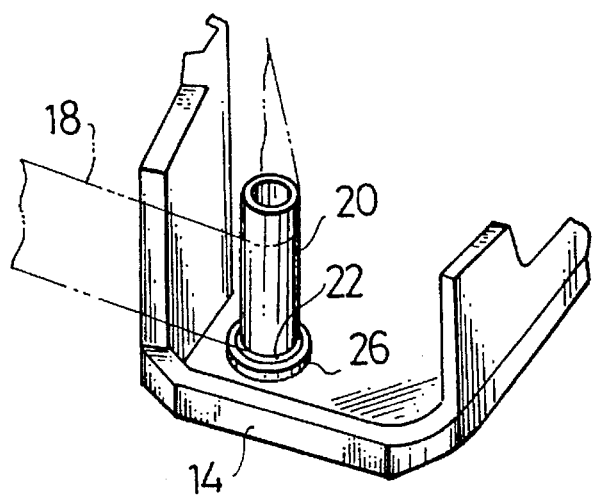
FIG. 2 is a fragmentary perspective view showing a fixed tape guide mounted in the magnetic tape cassette shown in FIG. 1.
Figure 3:
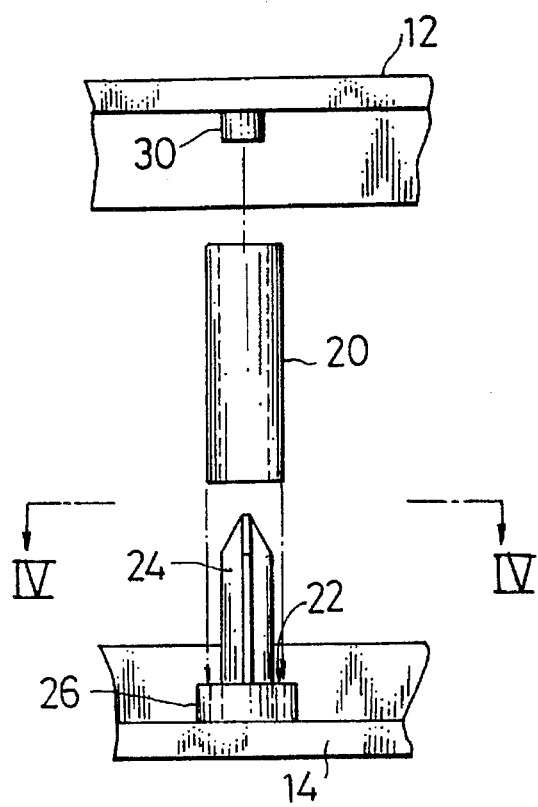
FIG. 3 is an exploded side elevation view of the fixed tape guide shown in FIG. 2.
Figure 4:
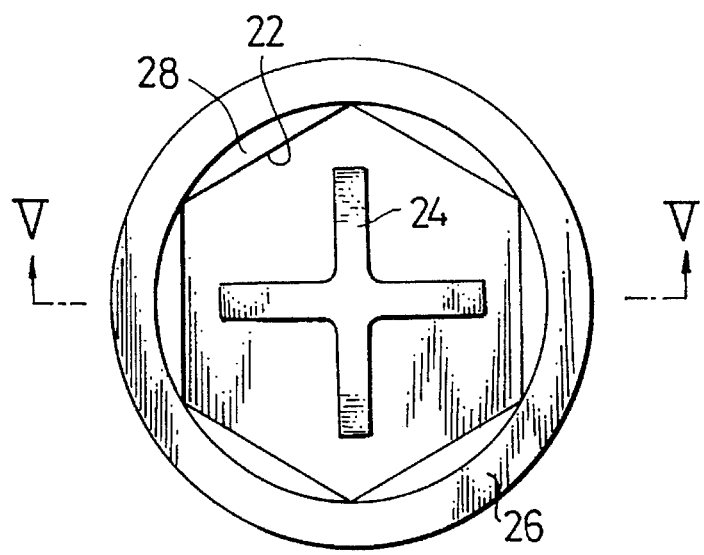
FIG. 4 is an enlarged plan view taken along line VI—VI of FIG. 3.
Figure 5:
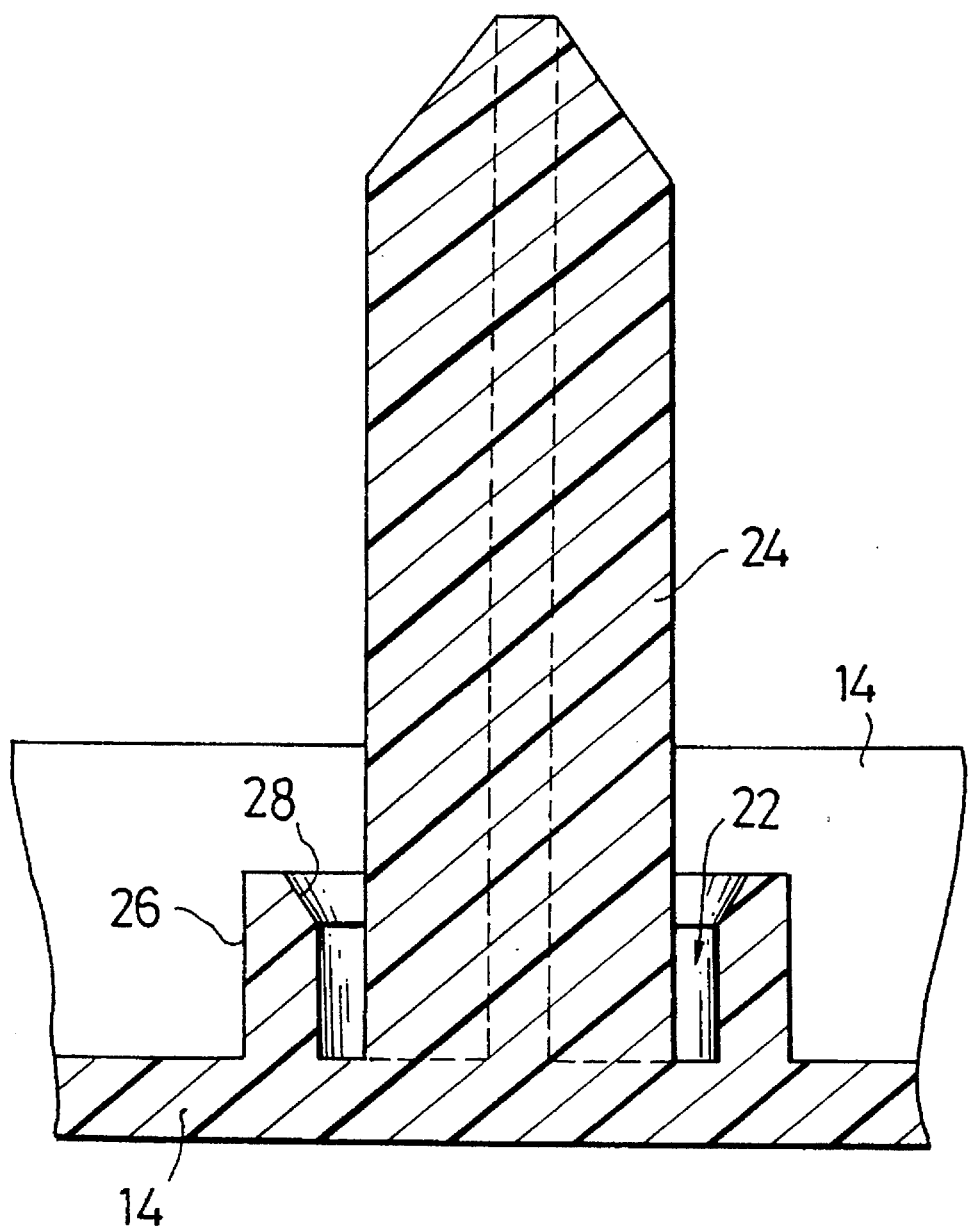
FIG. 5 is an enlarged vertical sectional view taken along line V—V of FIG. 4.

Referring first to FIGS. 1 to 4 showing an embodiment of a magnetic tape cassette according to the present invention, a magnetic tape cassette of the illustrated embodiment includes a casing 10 comprising an upper casing member 12 and a lower casing member 14 joined together so as to define a space therebetween and a pair of reels 16 rotatably arranged in the casing 10. On the reels 16 is wound a magnetic tape 18 so that it may travel along a tape travel path defined therebetween while extending or being stretched therebetween. Also, the magnetic tape cassette includes a fixed tape guide 20 arranged on the tape travel path. In the illustrated embodiment, the fixed tape guide 20 is formed into a hollow cylindrical shape and mounted in the casing 10. The casing 10 is also formed therein with a polygonal fitted-on hole provided with a recess 22 in which the tape guide 20 is pressedly fitted. On a central portion of the recess 22 is fixed a guide rib 24 so as to inward vertically extend therefrom. The guide rib 24 is formed into a maximum dimension or size in a cross section smaller than an inner diameter of the fixed tape guide 20.

In the illustrated embodiment, a cylindrical member 26 provided therein with the above-described fitted-on hole, which hole may be formed into a suitable shape such as a regular tetragon, a regular hexagon, a regular octagon or the like, is provided on an inner surface of one of the casing members 12 and 14. More specifically, it is arranged on an inner surface of the lower casing member 14. The recess 22 is defined on a slant surface 28 formed by beveling an inner periphery of an upper end of the cylindrical member 26. Such construction facilitates pressed fitting of the fixed tape guide 20 comprising, for example, a pipe-like cylinder in the recess 22. Also, in the illustrated embodiment, the guide rib 24 may be cross-shaped so as to radially extend and tapered at a distal end thereof. Alternatively, the fixed guide rib 24 may be formed into a shape like a star-like impeller having blades radially arranged and tapered at a distal end thereof. Such construction of the guide rib 24 permits it to positively hold the fixed tape guide 20 therein while permitting it to abut against an inner peripheral surface of the fixed tape guide 20. The fixed tape guide 20 is preferably tightly or snugly fitted at an upper end thereof on a projection 30 provided on an inner surface of the opposite casing member or upper casing member 12. For this purpose, the projection 30 may be formed into a diameter sufficient to permit it to be fittedly inserted in the upper end of the fixed tape guide 20. Such construction effectively prevents the fixed tape guide 20 from falling or dislocating.

As will be noted from the foregoing, the recess 22 in which the tape guide 20 is pressedly fixedly fitted at the lower end thereof is polygonally formed at the cylindrical member 26 provided on the inner surface of the casing 10 so as to inward project therefrom and the guide rib 24 comprises the impeller-like member having a maximum dimension or size in a cross section smaller than the inner diameter of the fixed tape guide 20. Thus, the tape guide 20 is positively securely fitted at the lower end thereof in the recess 22 while being smoothly guided along the guide rib 24.

As can be seen from the foregoing, the present invention is so constructed that the recess in which the fixed tape guide is pressedly securely fitted is formed on the inner surface of the casing through the polygonal fitted-on hole and the guide rib which is formed into a size smaller than the inner diameter of the fixed tape guide is mounted on the central portion of the recess so as to inwardly extend therefrom. Such construction permits the tape guide to be stably and positively supported in the casing without generating any backlash and displacement, to thereby prevent a failure in smooth traveling of the magnetic tape due to a failure in proper arrangement of the tape guide. Also, it ensures mounting of the tape guide with sufficient strength to permit the magnetic tape to safely travel high reliability. Further, arrangement of the guide rib not only facilitates positioning of the tape guide and increases strength at which the tape guide is mounted on the casing but facilitates assembling of the tape cassette to improve the productivity. In addition, it positively prevents dislocation of the tape guide securely mounted on the casing.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A magnetic tape cassette comprising:

a casing including an upper casing member and a lower casing member jointed together so as to define a space therein;

a pair of reels which are rotatably arranged in said casing and on which a magnetic tape is wound so as to extend therebetween;

said magnetic tape being arranged so as to travel along a tape travel path defined between said reels;

a fixed tape guide of a hollow cylindrical shape mounted on said casing so as to be arranged on said tape travel path;

a recess provided on an inner surface of said casing through a polygonal fit-on hole so as to permit said tape guide to be pressedly fitted therein; and a solid guide rib formed into a size smaller than an inner diameter of said fixed tape guide and arranged on a central portion of said recess so as to inward extend therefrom, wherein said guide rib is configured to simulate the shape of a star-like impeller member having blades radially arranged and extending the length of the guide rib, said blades having a thickness which is smaller than a thickness of either of said upper and lower casing members, the blades constitute a majority of an outer surface area of the guide rib.

2. A magnetic tape cassette as defined in claim 1, wherein said recess has a slant surface by beveling an upper end of said polygonal fit-on hole.

3. A magnetic tape cassette as defined in claim 1, wherein said recess is provided on said lower casing member and said fixed tape guide is fitted at a lower end thereof in said recess.

4. A magnetic tape cassette as defined in claim 3, further comprising a projection provided on an inner surface of said upper casing member and formed into a diameter sufficient to permit it to be fittedly inserted in an upper end of said fixed tape guide.

5. A magnetic tape cassette as defined in claim 2, wherein said recess is provided on said lower casing member and said fixed tape guide is fitted at a lower end thereof in said recess.

6. A magnetic tape cassette as defined in claim 1, wherein said recess is provided on said lower casing member and said fixed tape guide is fitted at a lower end thereof in said recess.

7. A magnetic tape cassette as defined in claim 1, further comprising a projection provided on an inner surface of said upper casing member and formed into a diameter sufficient to permit it to be fittedly inserted in an upper end of said fixed tape guide.

8. In an improved magnetic tape cassette having a molded housing of an upper casing member and a lower casing member joined together so as to define a space therein, a pair of reels rotatably arranged in the casing member space and having a magnetic tape extending between the reels, the improvement comprising:

one of the casing members providing a polygonal shaped wall defining a fitting aperture;

a guide rib of a solid non-circular configuration is integrally molded with the casing member to extend within and from the fitting aperture towards the other casing member to reach a height above a height of the polygonal shaped wall, said guide rib comprised of radial extending blades, said blades having a thickness which is smaller than a thickness of either of said upper and lower casing members, said blades constituting a majority of an outer surface area of said guide rib;

a tape guide member mounted in the polygonal shaped fitting aperture for contacting the tape extending between the reels, the tape guide member is hollow and extends over the guide rib and contacts the guide rib to positively hold the tape guide member in a fixed position with the fitting aperture, and a securement means on the other casing member for contacting the tape guide member.

9. The invention of claim 8 wherein the tape guide member is a hollow cylinder that is press-fitted into the fitting aperture.

10. The invention of claim 8 wherein the guide rib has an X-cross-sectional shape.

11. In an improved magnetic tape cassette having a housing of an upper casing member and a lower casing member joined together so as to define a space therein, a pair of reels rotatably arranged in the casing member space and having a magnetic tape extending between the reels the improvement comprising:

one of the casing members providing an annular cavity defining a fitting aperture;

a hollow tape guide member mounted in the fitting aperture for contacting the tape extending between the reels, and a guide member centrally located within the annular cavity and extending into the hollow tape guide member to facilitate the mounting of the tape guide member into the fitting aperture, the guide member including radially extending blades for contacting the interior of the hollow tape guide member and positively holding it in a fixed position with the fitting aperture, said blades having a thickness which is smaller than a thickness of either of said upper and lower casing members, and said blades constitute a majority of an outer surface area of said guide member.

12. The invention of claim 11 further including a securement means on the other casing member for contacting the tape guide member.

13. The invention of claim 11 wherein the fitting aperture has a polygonal shaped wall defining the aperture.

14. The invention of claim 11 wherein the guide member has an X-cross-sectional shape.

15. The invention of claim 11 wherein the tape guide member is a hollow cylinder that is press-fitted into the fitting aperture.

16. The invention of claim 13 wherein an upper edge of the polygonal shaped wall is beveled radially inward to facilitate mounting of the tape guide member during assembly.

17. In an improved magnetic tape cassette having a housing of an upper casing member and a lower casing member joined together so as to define an interior space therebetween, a pair of reels rotatably arranged in the interior space and having a magnetic tape extending between the reels, the improvement comprising:

a hollow cylindrical member supported vertically in the interior space between the upper and lower casing members for guiding the magnetic tape extending between the reels;

a first projection extending into the interior space from one of the upper and lower casing members, the first projection being larger than an exterior of the hollow cylindrical member;

an aperture formed in said first projection to receive one end of the hollow cylindrical member, the aperture having a plurality of vertical side walls arranged as a regular polygon and sized to contact portions of the exterior of the one end of the hollow cylindrical member;

an annular bevel surrounding the vertical side walls and defining an entrance to the aperture, the annular bevel having an outside diameter that is larger than the exterior of the hollow cylindrical member to guide the one end of the hollow cylindrical member into the aperture;

a guide post extending vertically from a central portion of the aperture and above the entrance to the aperture to fit into the one end of the hollow cylindrical member, the guide post having radial extending ribs that are sized to contact portions of an interior of the one end of the hollow cylindrical member, the radial extending ribs constitute a majority of an outer surface area of the guide post; and a second projection extending into the interior space from an other one of the upper and lower casing members, the second projection being sized to contact the interior of an other end of the hollow cylindrical member.

18. The invention of claim 17 wherein the guide post has an X-shaped cross section.

19. In an improved magnetic tape cassette having a housing of an upper casing member and a lower casing member joined together so as to define an interior space therebetween, a pair of reels rotatably arranged in the interior space and having a magnetic tape extending between the reels, the improvement comprising:

a hollow cylindrical member fixedly supported to be vertically positioned in the interior space between the upper and lower casing members for guiding the magnetic tape extending between the reels;

a first projection extending into the interior space from one of the upper and lower casing members, the first projection being larger than an exterior of the hollow cylindrical member;

an aperture formed in said first projection to receive one end of the hollow cylindrical member, the aperture having a plurality of vertical side walls arranged as a regular polygon and sized to contact portions of the exterior of the one end of the hollow cylindrical member;

an annular bevel surrounding the vertical side walls and defining an entrance to the aperture, the annular bevel having an outside diameter that is larger than the exterior of the hollow cylindrical member to guide the one end of the hollow cylindrical member into the aperture;

a guide post extending vertically from a central portion of the aperture and above the entrance to the aperture to fit into the one end of the hollow cylindrical member, the guide post having four radial extending ribs that are sized to contact portions of an interior of the one end of the hollow cylindrical member, a cross-sectional view of the four radial extending ribs has an X-configuration; and a second projection extending into the interior space from an other one of the upper and lower casing members, the second projection being sized to contact the interior of an other end of the hollow cylindrical member.

20. In an improved magnetic tape cassette having a housing of an upper casing member and a lower casing member joined together so as to define an interior space therebetween, a pair of reels rotatably arranged in the interior space and having a magnetic tape extending between the reels, the improvement comprising:

a hollow cylindrical member supported vertically in the interior space between the upper and lower casing members for guiding the magnetic tape extending between the reels;

a first projection extending into the interior space from one of the upper and lower casing members, the first projection being larger than an exterior of the hollow cylindrical member;

an aperture formed in said first projection to receive one end of the hollow cylindrical member, the aperture having a plurality of vertical side walls arranged as a regular polygon and sized to contact portions of the exterior of the one end of the hollow cylindrical member;

an annular bevel surrounding the vertical side walls and defining an entrance to the aperture, the annular bevel having an outside diameter that is larger than the exterior of the hollow cylindrical member to guide the one end of the hollow cylindrical member into the aperture;

a solid guide post extending vertically from a central portion of the aperture and above the entrance to the aperture to fit into the one end of the hollow cylindrical member, the solid guide post consisting of substantially a plurality of planar surfaces forming radial extending ribs that are sized to contact portions of an interior of the one end of the hollow cylindrical member, the planar surfaces of the ribs constitute a majority of an outer surface area of the guide post; and a second projection extending into the interior space from an other one of the upper and lower casing members, the second projection being sized to contact the interior of an other end of the hollow cylindrical member.

* * * * *